(12) United States Patent
Yamamoto

(10) Patent No.: US 7,740,426 B2
(45) Date of Patent: Jun. 22, 2010

(54) DEEP-HOLE DRILL HAVING BACK-TAPERED WEB

(75) Inventor: Takahiro Yamamoto, Toyokawa (JP)

(73) Assignee: OSG Corporation, Toyokawa-shi (JP)

( * ) Notice: Subject to any disclaimer, the term of this patent is extended or adjusted under 35 U.S.C. 154(b) by 1015 days.

(21) Appl. No.: 11/483,626

(22) Filed: Jul. 11, 2006

(65) Prior Publication Data

US 2006/0275092 A1 Dec. 7, 2006

Related U.S. Application Data

(63) Continuation-in-part of application No. 10/462,754, filed on Jun. 17, 2003, now abandoned.

(30) Foreign Application Priority Data

Oct. 2, 2002 (JP) .............................. 2002-289464

(51) Int. Cl.
B23B 51/02 (2006.01)
(52) U.S. Cl. ........................................ 408/230; 408/59
(58) Field of Classification Search ................... 408/59, 408/227, 229, 230; B23B 51/00, 51/02
See application file for complete search history.

(56) References Cited

U.S. PATENT DOCUMENTS

| | | | |
|---|---|---|---|
| 5,350,261 A * | 9/1994 | Takaya et al. ................ | 408/229 |
| 5,678,960 A | 10/1997 | Just et al. | |
| 6,113,321 A | 9/2000 | Mulroy et al. | |
| 6,688,817 B2 | 2/2004 | Borschert et al. | |
| 7,201,543 B2 * | 4/2007 | Muhlfriedel et al. ........ | 408/230 |
| 2003/0053873 A1 | 3/2003 | Schaffer | |
| 2007/0081870 A1 * | 4/2007 | Muhlfriedel et al. ........ | 408/230 |
| 2007/0237594 A1 * | 10/2007 | Lang et al. ................... | 408/230 |
| 2009/0047080 A1 * | 2/2009 | Schweighofer et al. ....... | 408/59 |

FOREIGN PATENT DOCUMENTS

| | | |
|---|---|---|
| JP | A-S63-89210 | 4/1988 |
| JP | A-S63-245310 | 10/1988 |
| JP | 2-109620 | 4/1990 |
| JP | U 2-56517 | 4/1990 |
| JP | A 3-55105 | 3/1991 |
| JP | A-H4-244311 | 9/1992 |
| JP | U-H5-29615 | 4/1993 |
| JP | U-60715 | 8/1993 |
| JP | A-H5-261612 | 10/1993 |

(Continued)

*Primary Examiner*—Eric A Gates
(74) *Attorney, Agent, or Firm*—Oliff & Berridge, PLC

(57) ABSTRACT

A drill having a web which is provided by a central portion of a cylindrical main body of the drill and which includes a back-tapered portion and a constant-thickness portion. The cylindrical main body has a large diameter portion and a small diameter portion contiguous to the large diameter portion, such that a step is provided between the large and small diameter portions. The large diameter portion provided by the axially distal end portion of the cylindrical main body has an axial length which is larger than an axial length of the back tapered portion of the web provided by the axially distal end portion of the web, such that a boundary between the back-tapered portion and the constant-thickness portion of the web is located in the large diameter portion of the cylindrical main body.

11 Claims, 4 Drawing Sheets

FOREIGN PATENT DOCUMENTS

| | | |
|---|---|---|
| JP | B2-H6-20655 | 3/1994 |
| JP | U-H6-71013 | 10/1994 |
| JP | A 7-237017 | 9/1995 |
| JP | A-H7-308814 | 11/1995 |
| JP | A 9-11015 | 1/1997 |
| JP | A 9-501109 | 2/1997 |
| JP | A-H10-6114 | 1/1998 |
| JP | U 63-10013 | 1/1998 |
| JP | A 2000-52119 | 2/2000 |
| JP | 2000-84720 A | 3/2000 |
| JP | 2003-94221 A | 4/2003 |
| JP | 2003-127015 A | 5/2003 |
| JP | 2003-205411 A | 7/2003 |
| JP | 2004-122295 A | 4/2004 |
| JP | 2004-230514 A | 8/2004 |

* cited by examiner

| | TESTED DRILL | V (m/min) | f (mm/rev) | Ry |
|---|---|---|---|---|
| CONDITION No.1 | DRILL OF INVENTION | 90 | 0.20 | 3 μm OR LESS |
| CONDITION No.2 | CONVENTIONAL DRILL | 80 | 0.14 | 3 μm OR LESS |
| CONDITION No.3 | CONVENTIONAL DRILL | 90 | 0.07 | 3 μm OR LESS |
| CONDITION No.4 | CONVENTIONAL DRILL | 90 | 0.07 | OVER 3 μm |

NUMBER OF DRILLED HOLES

- CONDITION No.1: 666
- CONDITION No.2: 3
- CONDITION No.3: 257
- CONDITION No.4: 1

|  | TESTED DRILL | V (m/min) | f (mm/rev) | Ry |
|---|---|---|---|---|
| CONDITION No.1 | DRILL OF INVENTION | 90 | 0.20 | 3 μm OR LESS |
| CONDITION No.2 | CONVENTIONAL DRILL | 80 | 0.14 | 3 μm OR LESS |
| CONDITION No.3 | CONVENTIONAL DRILL | 90 | 0.07 | 3 μm OR LESS |

NUMBER OF DRILLED HOLES

DEEP-HOLE DRILL HAVING BACK-TAPERED WEB

This is a Continuation-In-Part application of application Ser. No. 10/462,754, filed on Jun. 17, 2003 now abandoned.

BACKGROUND OF THE INVENTION

1. Field of the Invention

This invention relates in general to a drill for drilling a deep hole, and more particularly to such a drill having a long tool life without suffering from its breakage due to chip packing or poor chip removal in a deep-hole drilling operation at a high drilling speed.

2. Discussion of the Related Art

There is widely known a deep-hole drill having a chip evacuation flute or flutes whose axial length is at least five times or at least ten times as large as a diameter of the drill, for drilling a deep hole having a large depth that is at least five times or at least ten times as large as a diameter of the hole. As one example of the deep-hole drill, JP-U-H5-60715 (publication of unexamined Japanese Utility Application laid open in 1993) discloses a drill in which each chip evacuation flute has a width larger in an axially proximal end portion of the main body (i.e., a portion of the main body adjacent to the shank) than in an axially distal end portion of the main body, in the interest of preventing chip packing. As another example of the deep-hole drill, JP-A-H5-261612 (publication of unexamined Japanese Patent Application laid open in 1993) discloses a drill in which the web thickness is smaller in an axially proximal end portion of the main body than in an axially distal end portion of the main body. As still another example of the deep-hole drill, JP-A-S63-89210 (publication of unexamined Japanese Patent Application laid open in 1988) discloses a drill in which the surface of each chip evacuation flute is finished by a polishing operation and has a surface roughness Rz of not larger than 3 μm.

However, in a drilling operation with the drill disclosed by JP-A-H5-261612 in which the web thickness is changed in steps rather than continuously, smooth evacuation or removal of cutting chips from the hole is impeded due to the stepped change of the web thickness, suffering from a risk of the breakage. For example, where this conventional drill is adapted to have a diameter D of not larger than 8 mm for drilling a deep hole having a depth that is at least ten times as large as the diameter D of the drill, the drill is not capable of always drilling the deep hole in a high-speed drilling condition in which the drill is fed at a feed rate f of at least 0.10 mm/rev while being rotated at a peripheral velocity V of at least 80 m/min. In such a high-speed drilling condition, the drill sometimes suffers from its breakage due to chip packing or poor chip removal from the drilled hole. Therefore, the deep-hole drilling operation can not be satisfactorily achieved by the conventional drill, without reducing the feed rate f and/or the peripheral velocity V, or without adopting a so-called "step drilling" (i.e., feeding the drill in an intermittent manner).

SUMMARY OF THE INVENTION

The present invention was made in view of the background prior art discussed above. It is therefore a first object of the present invention to provide a drill having a long tool life without suffering from its breakage due to chip packing or poor chip removal in a deep-hole drilling operation at a high drilling speed. This first object may be achieved according to any one of first through thirteenth aspects of the invention which are described below.

It is a second object of the invention to provide a process of drilling a hole in a workpiece by using the drill having the technical advantage as described above. This second object may be achieved according to a fourteenth aspect of the invention which is described below.

The first aspect of this invention provides a drill which comprises a cylindrical main body and a shank contiguous to each other, and which is to be rotated about an axis of the cylindrical main body in a predetermined rotating direction, for drilling a hole in a workpiece, wherein the cylindrical main body has: (a) at least one flute each of which is formed in the cylindrical main body and extends from an axially distal end of the cylindrical main body to an axially proximal end of the cylindrical main body, so as to provide a cutting lip or edge at the axially distal end of the cylindrical main body; (b) at least one land each of which is provided by a peripheral portion of the cylindrical main body not cut away by the above-described at least one flute; and (c) a web provided by a central portion of the cylindrical main body which extends in an axial direction of the cylindrical main body; wherein the web includes a back-tapered portion which is provided by at least an axially distal end portion of the web, such that a thickness of the web in the back-tapered portion is gradually or continuously reduced as viewed in a direction away from the axially distal end of the cylindrical main body toward the shank.

According to the second aspect of the invention, in the drill defined in the first aspect of the invention, the thickness of the web in the back-tapered portion is reduced at a constant rate as viewed in the direction away from the axially distal end of the cylindrical main body toward the shank.

According to the third aspect of the invention, in the drill defined in the first or second aspect of the invention, the back-tapered portion of the web is provided by not only the axially distal end portion but also axially proximal end and intermediate portions of the web.

According to the fourth aspect of the invention, in the drill defined in the first or second aspect of the invention, the back-tapered portion of the web is provided by only the axially distal end portion of the web which has a predetermined axial length not smaller than a diameter of the drill, wherein the web further includes a non-back-tapered portion which is provided by axially proximal end and intermediate portions of the web, such that the thickness of the web in the non-back-tapered portion is constant.

According to the fifth aspect of the invention, in the drill defined in the first or second aspect of the invention, the back-tapered portion of the web is provided by only the axially distal end portion of the web which has a predetermined axial length not smaller than a diameter of the drill, wherein the web further includes a non-back-tapered portion which is provided by axially proximal end and intermediate portions of the web, such that the thickness of the web in the non-back-tapered portion is increased as viewed in the direction away from the axially distal end of the cylindrical main body toward the shank.

According to the sixth aspect of the invention, in the drill defined in any one of the first through fifth aspects of the invention, a relationship between a diameter of the drill and a maximum value of the thickness of the web and a relationship between the diameter of the drill and a minimum value of the thickness of the web are represented by the following expressions:

$$0.2D \leq W_1 \leq 0.4D;$$

$$0.15D \leq W_2 \leq 0.33D;$$

where D represents the diameter of the drill;

$W_1$ represent the maximum value of the thickness of the web; and $W_2$ represent the minimum value of the thickness of the web.

According to the seventh aspect of the invention, in the drill defined in any one of the first through sixth aspects of the invention, a flute-width ratio of a width of each of the above-described at least one flute to a width of each of the above-described at least one land is 0.6-1.5 in a web-thickness maximized portion of the cylindrical main body in which the thickness of the web is maximized while the flute-width ratio is 0.8-1.7 in a web-thickness minimized portion of the cylindrical main body in which the thickness of the web is minimized. It is noted that the width of each of the above-described at least one flute and the width of each of the above-described at least one land may be defined by a central angle $\theta_2$ of each flute and a central angle $\theta_1$ of each land, respectively.

According to the eighth aspect of the invention, in the drill defined in any one of the first through seventh aspects of the invention, a surface of each of the above-described at least one flute has a roughness curve whose maximum height Ry of not larger than 3 μm.

According to the ninth aspect of the invention, in the drill defined in the eighth aspect of the invention, the cylindrical main body is coated with a hard coating, and the surface of each of the above-described at least one flute coated with the hard coating is polished so as to have the roughness curve whose maximum height Ry of not larger than 3 μm.

According to the tenth aspect of the invention, in the drill defined in any one of the first through ninth aspects of the invention, the above-described at least one flute consists of two flutes which are symmetrical with respect to the axis of the cylindrical main body, wherein the above-described at least one land consists of two lands which are joined by the web and each of which is located between the two flutes, and wherein a front-side wall of each of the two flutes (as viewed in the predetermined rotating direction) is concaved in a direction away from a leading edge which is provided by a rear-side one of widthwise opposite edges of each of the two flutes (as viewed in the predetermined rotating direction), such that a most concaved portion of the front-side wall is distant from a straight line which passes through the axis and a heel or rear end of a corresponding one of the two lands (as viewed in the predetermined rotating direction), by a predetermined distance that is equal to a half of value represented by the following expression:

0.15D≦t≦0.35D;

where D represents a diameter of the drill; and t represents the value that is twice as large as the predetermined distance.

It is noted that the above-described rear end of the land corresponds to an intersection of the front-side wall of each flute and the outer circumferential surface of the corresponding one of the two lands. Where a beveled face is formed in the rear end of each land or at the intersection of the front-side wall of each flute and the outer circumferential surface of the corresponding land, the rear end or intersection is an imaginary rear end or intersection.

According to the eleventh aspect of the invention, in the drill defined in any one of the first through tenth aspects of the invention, the above-described at least one flute has an axial length of at least ten times as large as a diameter of the drill which is not larger than 8 mm. The axial length of the flute corresponds to a so-called "flute length" which is a length, as measured in a direction parallel with the axis of the cylindrical main body, from an outer corner of the cutting lip to an extreme back end of the flute. An increase in the axial length of the flute leads to an increase in a maximum distance over which the drill can be continuously fed in a depth direction for drilling a hole without necessity of adopting a step drilling cycle.

According to the twelfth aspect of the invention, in the drill defined in any one of the first through eleventh aspects of the invention, the drill further comprises an oil hole which is formed through the cylindrical main body and the shank and which opens in an end flank face located on a rear side of the cutting edge as viewed in the above-described predetermined rotating direction.

According to the thirteenth aspect of the invention, in the drill defined in any one of the first through twelfth aspects of the invention, the cylindrical main body has a large diameter portion provided by an axially distal end portion thereof, and a small diameter portion provided by a portion thereof adjacent to the shank, the large diameter portion having a diameter which is reduced as viewed in the direction away from the axially distal end of the cylindrical main body toward the shank, the small diameter portion having a diameter which is smaller than the diameter of the large diameter portion and which is constant over an entire length of the small diameter portion.

The fourteenth aspect of the invention provides a process of drilling a hole in a workpiece by using the drill defined in any one of the first through thirteenth aspects of the invention, the process comprising a step of feeding the drill and the workpiece relative to each other at a feed rate of at least 0.10 mm/rev while rotating the drill and the workpiece relative to each other at a peripheral velocity of at least 80 m/min.

In the drill defined in any one of the first through thirteenth aspects of the invention, the web includes the back-tapered portion provided by at least the axially distal end portion of the web, such that the thickness of the web in the back-tapered portion is gradually or continuously reduced as viewed in the direction away from the axially distal end of the cylindrical main body toward the shank. This arrangement facilitates a smooth evacuation of chips from the drilled hole, thereby preventing a breakage of the drill which would be caused in the event of chip packing in the hole. The smooth evacuation of chip leads to an increase in the tool life, and makes it possible to achieve a deep-hole drilling operation with a high efficiency. For example, where the present drill has a diameter D (i.e., a diameter over the margins of the drill as measured at the point) of not larger than 8 mm for drilling a deep hole having a depth that is at least ten times as large as the drill diameter D, the drill is capable of satisfactorily drilling the deep hole in a high-speed drilling condition in which the drill is fed at a feed rate f of at least 0.10 mm/rev while being rotated at a peripheral velocity V of at least 80 m/min. That is, even in such a high-speed drilling condition, the drill is capable of drilling a sufficiently large number of deep holes successively without suffering from its breakage due to chip packing.

In the drill defined in the third aspect of the invention, the back-tapered portion is provided by not only the axially distal end portion of the web but also the axially proximal end and intermediate portions of the web, namely, the back-tapered portion extends throughout substantially the entire axial length of the flute except an extreme back end portion of the flute in which the flute runs out. In this arrangement, the chips are further smoothly evacuated from the drilled hole through the flute.

In the drill defined in the fourth or fifth aspect of the invention, the web includes the non-back-tapered portion in addition to the back-tapered portion provided by only the axially distal end portion of the web. Owing to the non-back-tapered portion, the web thickness is prevented from being excessively reduced, for thereby avoiding an easy breakage of the main body which would be caused by a considerable reduction in the strength of the main body.

In the drill defined in the sixth aspect of the invention, the relationship between the maximum value $W_1$ of the web thickness and the drill diameter D and the relationship between the minimum value $W_2$ of the web thickness and the drill diameter D are represented by the expressions $0.2D \leqq W_1 \leqq 0.4D$, $0.15D \leqq W_2 \leqq 0.33D$. These dimensional relationships are effective to obtain a sufficiently large cross sectional area of the flute for permitting a smooth evacuation of the chips, while preventing an excessive reduction in the web thickness which would cause an excessive reduction in the strength of the main body of the drill. Namely, owing to the dimensional relationships, the chips are smoothly evacuated through the flute while an easy breakage of the drill is prevented.

In the drill defined in the seventh aspect of the invention, the above-described flute-width ratio is 0.6-1.5 in the web-thickness maximized portion of the cylindrical main body, and is 0.8-1.7 in the web-thickness minimized portion of the cylindrical main body. In the drill of this seventh aspect of the invention, it is possible to obtain a sufficiently large cross sectional area of the flute for permitting a smooth evacuation of the chips, while preventing an excessive reduction in the width of each land which would cause an excessive reduction in the strength of the main body of the drill.

In the drill defined in the eighth aspect of the invention in which the surface roughness (maximum height Ry) of the flute is not larger than 3 μm, the surface smoothness of the flute facilitates displacement of the chips through the flute, thereby permitting a further smooth evacuation of the chips and further reliably preventing a breakage of the drill which would be caused in the event of chip packing.

In the drill defined in the ninth aspect of the invention, the cylindrical main body having the flute formed in its outer circumferential surface is coated with a hard coating, and the surface of the flute is polished, lapped or otherwise finished so as to have a desired degree of smoothness. In the drill of this ninth aspect of the invention, a wear of the flute surface is protected by the hard coating, so that a smooth evacuation of the chips is assured during a long period of time, whereby the tool life is further extended.

In the drill defined in the tenth aspect of the invention, the front-side wall of each of the two flutes is concaved in the direction away from the leading edge, i.e., the rear-side edge of the flute, such that the most concaved portion of the front-side wall is distant from the straight line which passes through the axis and the rear end of the corresponding land, by a predetermined distance t/2 that is equal to a half of value t satisfying the expression $0.15D \leqq t \leqq 0.35D$ (where D represents the drill diameter). Owing to the satisfaction of this expression as to the dimensional relationship between the value t and the drill diameter D, it is possible to obtain a sufficiently large cross sectional area of each flute for permitting a smooth evacuation of the chips, without suffering from the excessive reduction in the strength of the main body of the drill. Further, the drill of this tenth aspect of the invention is likely to produce short curly chips, so that the produced chips are easily broken into small pieces. Thus, the chips are further smoothly evacuated from the drilled hole.

The principle of the invention is advantageously applicable to a drill, as defined in the above-described eleventh aspect of the invention, having the drill diameter of not larger than 8 mm and the flute length of at least ten times as large as the drill diameter. However, the principle of the invention is further advantageously applicable to a drill having the drill diameter of not larger than 6 mm and the flute length of at least 15 times as large as the drill diameter. Further, the principle of the invention is applicable to also a drill having the drill diameter larger than 8 mm and the flute length of at least 4-5 times as large as the drill diameter.

The drill constructed according to this invention can be advantageously used in a deep-hole drilling operation in which a deep hole is drilled in a workpiece by feeding the drill and the workpiece relative to each other at a feed rate f of at least 0.10 mm/rev while rotating the drill and the workpiece relative to each other at a peripheral velocity V of at least 80 m/min. However, the drill can be further advantageously used in an operation in a higher-speed drilling condition, for example, with a feed rate f of at least 0.20 mm/rev and a peripheral velocity V of at least 90 mm/rev. Further, the drill can be used in an operation in a relatively low-speed drilling condition, for example, with a feed rate f lower than 0.10 mm/rev and a peripheral velocity V lower than 80 m/min.

It is preferable that each of the above-described at least one flute is formed to extend in a helical direction of the cylindrical main body so that the chips accommodated in the flutes are displaced toward the shank as the drill is rotated in the predetermined rotating direction. However, an entirety or part of each flute may be formed to extend in parallel with the axis of the cylindrical main body. Further, it is preferable that the above-described at least one flute consists of two flutes which are arranged symmetrically with respect to the axis of the cylindrical main body. However, the number of the flutes does not have to be necessarily two, but may be three or more. Further, the above-described at least one flute may consist of a single flute.

It is preferable that the thickness of the web in the back-tapered portion is reduced linearly, i.e., at a constant rate as viewed in the direction away from the axially distal end of the cylindrical main body toward the shank, as in the above-described second aspect of the invention. However, the rate of the reduction in the web thickness does not have to be necessarily constant, but may be gradually increased or reduced so that the web thickness in the back-tapered portion is reduced nonlinearly. Where the web-thickness reduction rate is increased, the back-tapered portion is radially outwardly convexed. Where the web-thickness reduction rate is reduced, the back-tapered portion is radially inwardly concaved.

The outside diameter of the cylindrical main body may be constant over its entire axial length so that the diameter of the cylindrical main body over its entire axial length is substantially equal to the drill diameter D. However, it is preferable that the cylindrical main body is slightly back-tapered for reducing a friction between the land surface of the main body and the inner surface of the drilled hole. Further, the cylindrical main body may have a large diameter portion provided by its axially distal end portion, and a small-diameter portion provided by its portion adjacent to the shank, as in the above-described thirteenth aspect of the invention. In this arrangement, a difference in the diameters of the large and small diameter portions may be not smaller than 0.1 mm.

The drill of this invention is preferably formed of a hard tool material such as cemented carbide, cermet and CBN (cubic boron nitrides) sintered body. However, the drill may be formed of a steel material such as sintered high speed steel, high speed tool steel and alloy tool steel. Further, the cylindrical main body and the shank may be formed of respective materials different from each other, for example, so that the main body is formed of a hard tool material while the shank is formed of a steel material.

It is preferable that the cylindrical main body is coated with a hard coating which is formed of, for example, TiAlN, TiCN and diamond material. The hard coating may be either of a multilayer coating and a single layer coating. The hard coating covering the cylindrical main body may be subjected to a surface finishing operation such as a lapping and a magnetic polishing.

Further, it is preferable that an oil hole is formed through the cylindrical main body and the shank so as to open in the end flank face, as in the above-described twelfth aspect of the invention, so that a cutting fluid or a compressed air is supplied to the cutting point through the oil hole as needed in a drilling operation.

BRIEF DESCRIPTION OF THE DRAWINGS

The above and other objects, features, advantages and technical and industrial significance of this invention will be better understood by reading the following detailed description of the presently preferred embodiments of the invention, when considered in connection with the accompanying drawings, in which.

DETAILED DESCRIPTION OF THE PREFERRED EMBODIMENTS

Figure 1A:
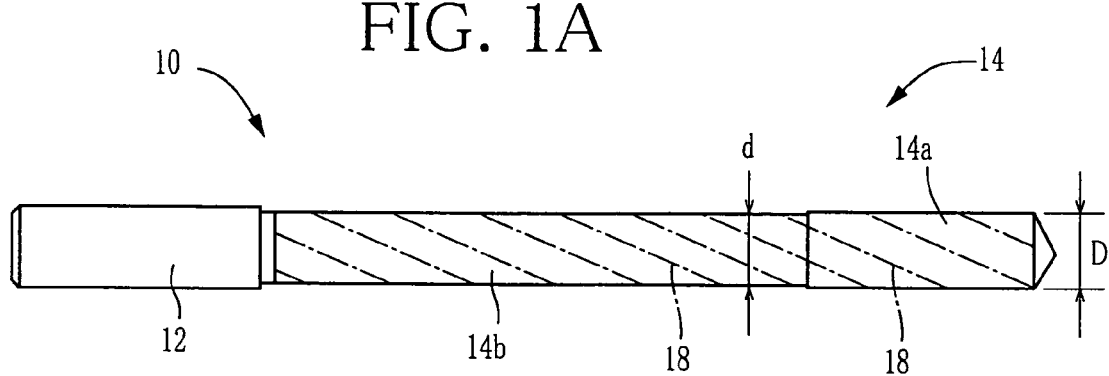
FIG. 1A is a side view of a deep-hole drill constructed according to an embodiment of the invention.
Figure 1B:
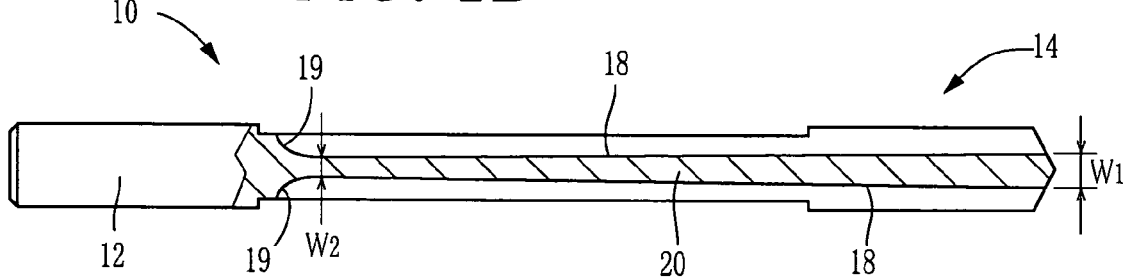
FIG. 1B is a view showing a continuous reduction of the web thickness in the drill of FIG. 1A.
Figure 1C:
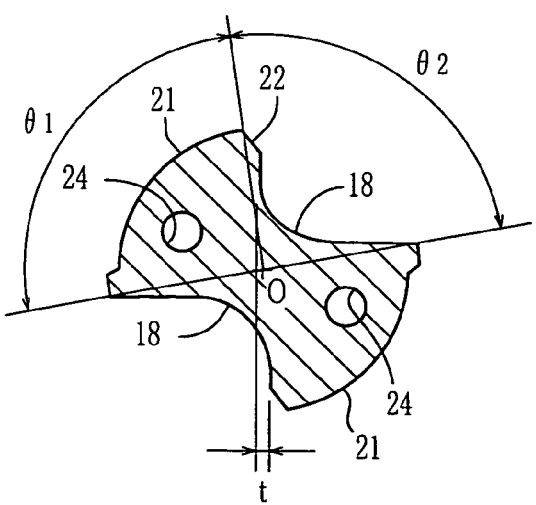
FIG. 1C is a transverse cross sectional view of the drill of FIG. 1A.
Figure 1D:
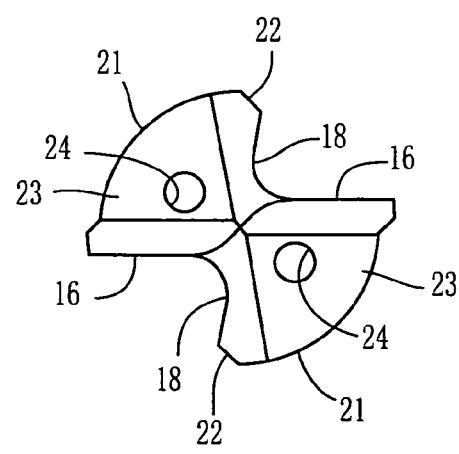
FIG. 1D is an end view of the drill of FIG. 1A.

FIGS. 1A-1D show a deep-hole drill 10 which is constructed according to an embodiment of this invention. FIG. 1A is a side view of the drill 10 as seen in a direction perpendicular to an axis O of the drill 10. FIGS. 1B and 1C are longitudinal and transverse cross sectional views of the drill 10. FIG. 1D is an end view of the drill 10, showing an axially distal end portion of the drill 10 in which a pair of cutting lips or edges 16 are formed symmetrically with respect to the axis O. This drill 10 is of a two-fluted twist drill, and is formed of a cemented carbide. The drill 10 includes a cylindrical shank 12 and a cylindrical main body 14 which are coaxial with each other and which are formed integrally with each other. The integrally formed cylindrical shank and main body 12, 14 cooperate with each other to constitute a body of the drill 10, which is referred to as a drill body. The cylindrical main body 14 is coated at its surface with a hard multilayer coating formed of TiAlN. The main body 14 has a pair of chip evacuation flutes 18 formed symmetrically with respect to the axis O and extend over substantially the entire axial length of the main body 14. Each of the flutes 18 is twisted in a clockwise direction by a predetermined helix angle with respect to the axis O. Each of the cutting edges 16 is provided by an axially distal open end of the corresponding flute 18. The cylindrical main body 14 further has a pair of lands 21 which correspond to peripheral portions of the main body 14 not cut away by the flutes 18. The lands 21 have respective outer circumferential surfaces in the form of land surfaces which have a clearance diameter.

In a drilling operation with this drill 10, the drill 10 is held at the shank 12 through a suitable drill chuck or end mill holder by a spindle of a machine tool such as a drilling machine, a milling machine and a lathe. The drill 10 is then rotated relative to a workpiece in a predetermined rotating direction, i.e., in a clockwise direction as seen in a direction away from the shank 12 toward the axially distal end of the cylindrical main body 14, while being axially moved toward the workpiece, so that the workpiece is cut by the cutting edges 16 whereby a hole is formed in the workpiece, while chips produced as a result of the cutting of the workpiece are evacuated from the drilled hole toward the shank 12 via the chip evacuation flutes 18. Although the drill 10 is of a twist drill (i.e., helical fluted drill, the drill 10 is illustrated in FIG. 1B as if it were of a straight fluted drill, for clarifying a gradual change in a thickness (diameter) W of a web 20 as viewed in the axial direction. It is also noted that the configuration of the cylindrical main body 14 shown in FIGS. 1A and B is defined by a rotary trajectory of a leading edge which is provided by a rear-side one of widthwise opposite edges of each flute 18 as viewed in the predetermined rotating direction.

The cylindrical main body 14 has a large diameter portion 14a provided by its axially distal end portion, and a small diameter portion 14b provided by its portion adjacent to the shank 12. The large diameter portion 14a has a drill diameter D (i.e., the diameter of the cutting edges 16) at its extreme distal end, and is back-tapered at a predetermined rate. The small diameter portion 14b has a diameter d which is smaller than the drill diameter D by about 0.2 mm and which is constant over its entire axial length. The large and small diameter portions 14a, 14b are contiguous to each other, with a step having a predetermined height between outer circumferential surfaces of the two portions 14a, 14b. An axial length of each flute 18 (i.e., flute length), which is substantially equal to an axial length of the cylindrical main body 14, is at least 15 times as large as the drill diameter D. In the present embodiment, the drill diameter D is about 6 mm while the flute length is about 134 mm. An axial length of the large diameter portion 14a, which is at least five times as large as the drill diameter D, is about 40 mm. It is noted that the drill diameter D and other diametrical dimensions of the drill 10 are measurements made after the cylindrical main body 14 is coated with the hard coating. In other words, the thickness of the hard coating is included in the diametrical dimensions of the dill 10. It is also noted that FIGS. 1A-1D are merely schematic views in which elements are not necessarily accurately illustrated, particularly, in their relative dimensions.

The web 20 is provided by a central portion of the cylindrical main body 14 which joins the lands 21. The web 20, extending in the axial direction of the cylindrical main body 14, includes a back-tapered portion in which the thickness W of the web 20 is gradually or continuously reduced at a constant rate as viewed in a direction away from the axially distal end of the cylindrical main body 14 toward the shank 12. In the present embodiment, the back-tapered portion is provided by not only the axially distal end portion of the web 20 but also the axially proximal end and intermediate portions of the web 20, namely, the back-tapered portion extends over substantially the entire axial length of each flute 18 except its extreme back end portion 19 in which the flute 18 runs out. The web thickness W is maximized in the distal end of the web 20 or the drill body, and is minimized in the proximal end of the web 20 which is adjacent to the extreme back end portion 19 of each flute 18. The maximum value $W_1$ of the web thickness W is 0.2D-0.4D, while the minimum value $W_2$ of the web thickness W is 0.15D-0.33D (where D represents the drill diameter). In the present embodiment, the maximum value $W_1$ and the minimum value $W_2$ of the web thickness W are about 0.33D (about 1.98 mm) and about 0.27D (about 1.62 mm), respectively, so that a taper ratio of the web 20 is −0.36/130 mm. The continuous reduction in the web thickness W can be obtained in a process of forming each flute 18 in the cylindrical main body 14. That is, in the flute forming process, a grinding wheel is continuously moved toward the drill body in a radial direction of the drill body, while being moved in a direction away from the axially distal end of the cylindrical main body 14 toward the shank 12, such that the desired taper ratio is established.

A flute-width ratio $\theta_2/\theta_1$ is minimized in the distal end of the drill body in which the web thickness W is maximized, and is maximized in the proximal end of the web 20. The minimum value of the flute-width ratio $\theta_2/\theta_1$ is 0.6-1.5, while the maximum value of the flute-width ratio $\theta_2/\theta_1$ is 0.8-1.7. In the present embodiment, the minimum value and the maximum value of the flute-width ratio $\theta_2/\theta_1$ are about 0.9 and 1.0, respectively. It is noted that the flute-width ratio $\theta_2/\theta_1$ is a ratio of a width of each flute 18 to a width of each land 21, wherein the width of each flute 18 and the width of each land 21 may be defined by a central angle $\theta_2$ of each flute 18 and a central angle $\theta_1$ of each land 21, respectively.

A cross sectional shape of each flute 18 corresponds to that of a peripheral portion of the grinding wheel used to from each flute 18. A front-side wall of each flute 18 as viewed in the drill rotating direction is concaved in a direction away from a leading edge provided by a rear-side one of widthwise opposite edges of the flute 18 as viewed in the drill rotating direction. The most concaved portion of the front-side wall is distant from a straight line which passes through the axis O and a rear end of the corresponding land 21 as viewed in the drill rotating direction, by a predetermined distance t/2 whose double value t is represented by the following expression:

0.15D≦t≦0.35D, where D represents the drill diameter.

It is noted that the above-described double value t may be referred to as a flute front-side wall concaved amount. In the present embodiment, this flute front-side wall concaved amount t is 0.22D which corresponds to about 1.3 mm. It is also noted that the above-described rear end of each land 21 is an imaginary rear end since a beveled face 22 is formed in the rear end of each land 21.

The surface of each flute 18, which is coated with the hard coating, is lapped so as to have the roughness curve whose maximum height Ry is not larger than 3 μm. A pair of oil holes 24 are formed throughout the entire axial length of the drill body, so as to extend in the helical direction, i.e., in parallel with each flute 18 which also extends in the helical direction. Each of the oil holes 24 is open at its an end in an end flank face 23, and is open at its another end in an end face of the shank 12, so that a cutting fluid or a compressed air is supplied to the cutting point through the oil holes 24 as needed when a hole is being drilled.

In the drill 10 constructed according to the present embodiment of the invention, the thickness W of the web 20 is gradually or continuously reduced as viewed in the direction away from the axially distal end of the cylindrical main body 14 toward the shank 12. This arrangement facilitates a smooth evacuation of chips from the drilled hole, thereby preventing a breakage of the drill 10 which would be caused in the event of chip packing in the hole. The smooth evacuation of chip leads to an increase in the tool life, and makes it possible to achieve a deep-hole drilling operation with a high efficiency. The drill 10 is capable of satisfactorily drilling a deep hole having a depth that is at least 15 times as large as the drill diameter D in a high-speed drilling condition, for example, in which the drill 10 is fed at a feed rate f of at least 0.10 mm/rev while being rotated at a peripheral velocity V of at least 80 m/min. That is, even in such a high-speed drilling condition, the drill 10 is capable of drilling a sufficiently large number of deep holes successively without suffering from its breakage due to chip packing.

In the drill 10 of the present embodiment of the invention, the back-tapered portion is provided by not only the axially distal end portion of the web 20 but also the axially proximal end and intermediate portions of the web 20, namely, the back-tapered portion extends throughout substantially the entire axial length of each flute 18 except an extreme back end portion of each flute 18 in which the flute 18 runs out. In this arrangement, the chips are further smoothly evacuated from the drilled hole through the flutes 18.

Further, the relationship between the maximum value $W_1$ of the web thickness and the drill diameter D and the relationship between the minimum value $W_2$ of the web thickness and the drill diameter D are represented by the expressions 0.2D≦$W_1$≦0.4D, 0.15D≦$W_2$≦0.33D. These dimensional relationships are effective to obtain a sufficiently large cross sectional area of each flute 18 for permitting a smooth evacuation of the chips, while preventing an excessive reduction in the web thickness W which would cause an excessive reduction in the strength of the main body 14 of the drill 10. Namely, owing to the dimensional relationships, the chips are smoothly evacuated through the flutes 18 while an easy breakage of the drill 10 is prevented.

Further, in the drill 10 of the present embodiment of the invention in which the flute-width ratio is 0.6-1.5 in the web-thickness maximized portion of the cylindrical main body 14, and is 0.8-1.7 in the web-thickness minimized portion of the cylindrical main body 14, it is possible to obtain a sufficiently large cross sectional area of each flute 18 for permitting a smooth evacuation of the chips, while preventing an excessive reduction in the width of each land 21 which would cause an excessive reduction in the strength of the main body 14 of the drill 10.

Further, in the drill 10 of the present embodiment of the invention in which the surface roughness (maximum height Ry) of the flutes 18 is not larger than 3 μm, the surface smoothness of the flutes 18 facilitates displacement of the chips through the flutes 18, thereby permitting a further smooth evacuation of the chips and further reliably preventing a breakage of the drill 10 which would be caused in the event of chip packing or poor chip removal.

Further, in the drill 10 of the present embodiment of the invention, the cylindrical main body 14 having the flutes 18 formed in its outer circumferential surface is coated with the hard coating, and the surface of each flute 18 is lapped, polished or otherwise finished so as to have a desired degree of smoothness. A wear of the flute surface is protected by the hard coating, so that a smooth evacuation of the chips is assured during a long period of time, whereby the tool life is further extended.

Further, in the drill 10 of the present embodiment of the invention in which the front-side wall of each flute 18 is concaved such that the above-described flute front-side wall concaved amount t is held within the range of 0.15D-0.35D (where D represents the drill diameter), it is possible to obtain a sufficiently large cross sectional area of each flute 18 for permitting a smooth evacuation of the chips, without suffering from the excessive reduction in the strength of the main body 14 of the drill 10. Further, the drill 10 is likely to produce short curly chips, so that the produced chips are easily broken into small pieces. Thus, the chips are further smoothly evacuated from the drilled hole.

Figures 2A, 2B:
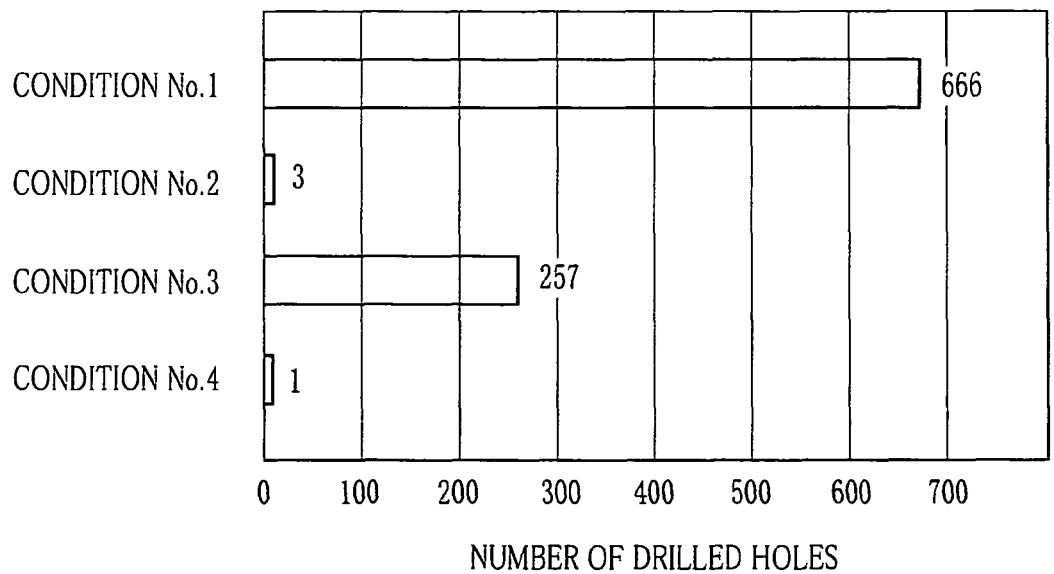
FIG. 2A is a table indicating drilling conditions under which deep holes each having a depth of 90 mm are drilled by the drill of the invention and conventional drills in a test for measuring a durability of each drill.
FIG. 2B is a graph indicating a result of the test of FIG. 2A.

A drilling test was conducted by using a drill constructed according to the present invention and also a conventional drill (in which the web does not include a back-tapered portion). In the test, deep holes each having a depth of 90 mm (about 15 times as large as a diameter of the hole) were successively formed in a workpiece made of S50C (carbon steel for machine structural use) under four different conditions, for checking durability of each drill by seeing the number of the holes formed successively without breakage of the drill. FIG. 2A is a table for indicating a peripheral velocity V (m/min) (rotation speed of the drill), a feed rate f (mm/rev) and a surface roughness Ry of each flute of the drill in each of the four conditions. FIG. 2B is a graph indicating the number of the holes formed without breakage of the drill, namely, the durability of the drill. In the condition No. 1 in which the drill of the present invention was used, 666 holes were successively formed without breakage of the drill. When the formation of 666 holes was completed in the condition No. 1, an amount of wear on a peripheral corner part of the drill was as small as about 0.3 mm, so that the drill appeared to be still capable of forming further holes. On the other hand, in the conditions Nos. 2-4 in each of which the conventional drill was used, the conventional drill suffered from its breakage after a small number of holes were formed, although a cutting speed (peripheral velocity V, feed rate f) was lower in the conditions Nos. 2-4 than in the condition No. 1. The numbers of the holes formed without breakage of the drill in the conditions Nos. 2-4 were 3, 2 57 and 1, respectively. In the test, the drill of the present invention thus exhibited a remarkably improved durability.

Figures 3A, 3B:
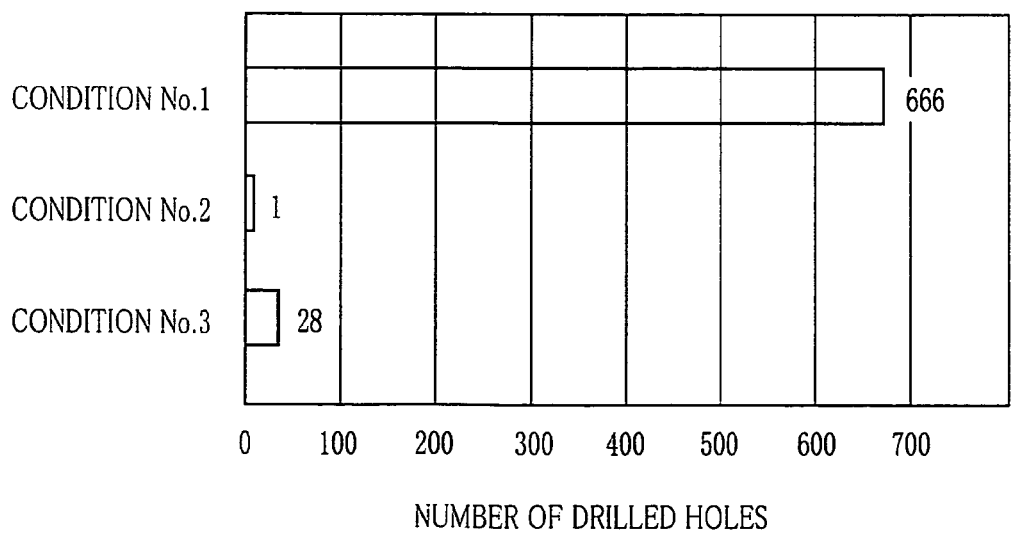
FIG. 3A is a table indicating drilling conditions under which deep holes each having a depth of 120 mm are drilled by the drill of the invention and conventional drills in another test for measuring a durability of each drill.
FIG. 3B is a graph indicating a result of the test of FIG. 3A.

Another drilling test was conducted by using the drill constructed according to the present invention and also the conventional drill. In this test, deep holes each having a depth of 120 mm (about 20 times as large as a diameter of the hole) were successively formed in a workpiece made of S50C under three different conditions. FIG. 3A is a table for indicating a peripheral velocity V (m/min), a feed rate f (mm/rev) and a surface roughness Ry of each flute of the drill, like the table of FIG. 2A. FIG. 3B is a graph indicating the durability of the drill, like the graph of FIG. 2B. In the condition No. 1 in which the drill of the present invention was used, 666 holes were successively formed without breakage of the drill. When the formation of 666 holes was completed in the condition No. 1, an amount of wear on a peripheral corner part of the drill was as small as about 0.5 mm, so that the drill appeared to be still capable of forming further holes. On the other hand, in the conditions Nos. 2 and 3 in each of which the conventional drill was used, the conventional drill suffered from its breakage after a small number of holes were formed, although a cutting speed was lower in the conditions Nos. 2 and 3 than in the condition No. 1. The numbers of the holes formed without breakage of the drill in the conditions Nos. 2 and 3 were 1 and 28, respectively. Also in this test, the drill of the present invention thus exhibited a remarkably improved durability.

Figure 4:
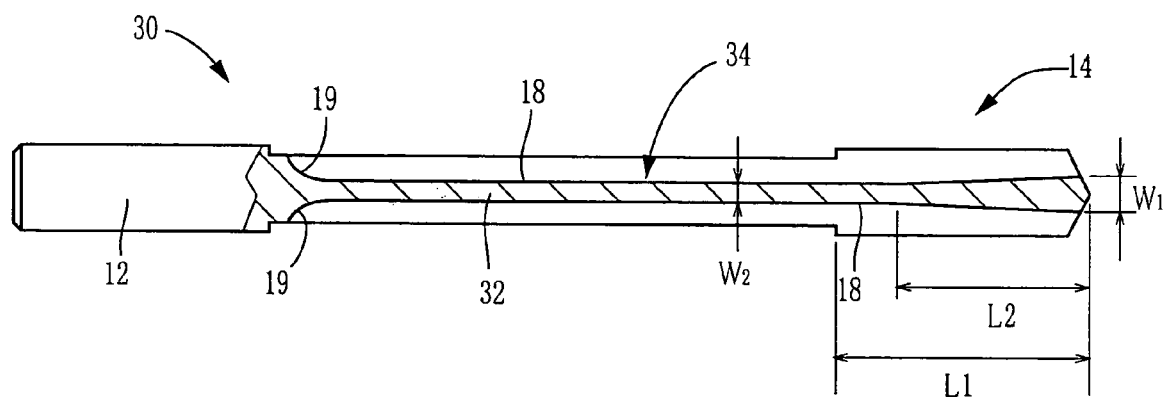
FIG. 4 is a view corresponding to that of FIG. 1B, showing a deep-hole drill constructed according to another embodiment of this invention.

FIG. 4 is a view corresponding to that of FIG. 1B, showing a deep-hole drill 30 constructed according to another embodiment of this invention. This drill 30 is different from the drill 10 of the above-described embodiment in that the back-tapered portion of a web 32 is provided by only the axially distal end portion of the web 32 which has a predetermined axial length L2. The axial length L2 of the axially distal end portion of the web 32, i.e., the axial length L2 of the back-tapered portion of the web 32 is not smaller than the drill diameter D. The web 32 includes, in addition to the back-tapered portion, a non-back-tapered portion 34 which is contiguous to the back-tapered portion and which is provided by the axially proximal end and intermediate portions of the web 32. The thickness of the web 32 in the back-tapered portion is reduced linearly, i.e., at a constant rate as viewed in the direction away from the axially distal end of the main body 14 toward the shank 12. The thickness of the web 32 is constant throughout the non-back-tapered portion 34. In this sense, the non-back-tapered portion 34 may be referred to as a constant-thickness portion. The axial length L2 of the back-tapered portion of the web 32 is smaller than an axial length L1 of the large diameter portion 14a that is provided by the axially distal end portion of the cylindrical main body 14. Thus, the step between the large diameter portion 14a and the small diameter portion 14b is closer to the shank 12, than a boundary between the back-tapered portion and the non-back-tapered portion 34. In other words, the boundary between the back-tapered portion and the non-back-tapered portion 34 is located in the large diameter portion 14a rather then in the small diameter portion 14b. The axial length L of the back-tapered portion is about 30 mm that is about five times as large as the drill diameter D. The web thickness W is maximized in the distal end of the web 32 or the drill body, and is minimized in the non-back-tapered portion 34. The maximum value $W_1$ of the web thickness W is 0.2D-0.4D, while the minimum value $W_2$ of the web thickness W is 0.15D-0.33D (where D represents the drill diameter). In the present embodiment, the maximum value $W_1$ and the minimum value $W_2$ of the web thickness W are about 0.30D (about 1.80 mm) and about 0.27D (about 1.62 mm), respectively, so that a taper ratio of the web 32 in the back-tapered portion is −0.18/30 mm.

The deep-hole drill 30 of this second embodiment of this invention provides substantially the same technical advantages as the drill 10 of the above-described embodiment, which is an advantage facilitating a smooth evacuation of chips from the drilled hole and thereby preventing a breakage of the drill which would be caused in the event of chip packing in the hole. Further, owing to the presence of the non-back-tapered portion in which the web thickness W is constant as viewed in the axial direction, the web thickness W is prevented from being excessively reduced, for thereby avoiding an easy breakage of the main body 14 which would be caused by a considerable reduction in the strength of the main body 14. Still further, owing to the arrangement in which the boundary is located in the large diameter portion 14a of the cylindrical main body 14 (rather than in the small diameter portion 14b), it is possible to prevent a breakage of the drill 30 even in presence of stress concentrated in the above-described boundary between the back-tapered portion and the non-back-tapered portion of the web 32.

While the presently preferred embodiments of the present invention have been illustrated above, it is to be understood that the invention is not limited to the details of the illustrated embodiments, but may be embodied with various other changes, modifications and improvements, which may occur to those skilled in the art, without departing from the spirit and scope of the invention defined in the following claims.

What is claimed is:

1. A drill which comprises a cylindrical main body and a shank contiguous to each other, and which is to be rotated about an axis of said cylindrical main body in a predetermined rotating direction, for drilling a hole in a workpiece, wherein said cylindrical main body has:
at least one flute each of which is formed in said cylindrical main body and extends from an axially distal end of said cylindrical main body to an axially proximal end of said cylindrical main body, so as to provide a cutting edge at said axially distal end of said cylindrical main body;
at least one land each of which is provided by a peripheral portion of said cylindrical main body not cut away by said at least one flute; and
a web provided by a central portion of said cylindrical main body which extends in an axial direction of said cylindrical main body;
wherein said web includes a back-tapered portion which is provided by at least an axially distal end portion of said web, such that a thickness of said web in said back-tapered portion is continuously reduced as viewed in a direction away from said axially distal end of said cylindrical main body toward said shank,
wherein said web further includes a constant-thickness portion which is contiguous to said back-tapered portion and which is provided by at least an axially proximal end portion of said web, such that the thickness of said web in said constant-thickness portion is constant,
wherein said cylindrical main body has a large diameter portion provided by an axially distal end portion thereof, and a small diameter portion contiguous to said large diameter portion and having a diameter that is smaller than a diameter of said large diameter portion, such that a step is provided between said large and small diameter portions,
and wherein said large diameter portion provided by said axially distal end portion of said cylindrical main body has an axial length which is larger than an axial length of said back tapered portion of said web provided by said axially distal end portion of said web, such that a boundary between said back-tapered portion and said constant-thickness portion of said web is located in said large diameter portion of said cylindrical main body.

2. The drill according to claim 1,
wherein said back-tapered portion of said web is provided by only said axially distal end portion of said web, while said constant-thickness portion of said web is provided by said axially proximal end portion of said web and an axially intermediate portion of said web,
and wherein said axial length of said back-tapered portion is not smaller than said diameter of said large diameter portion.

3. The drill according to claim 1, wherein the thickness of said web in said back-tapered portion is reduced at a constant rate as viewed in the direction away from said axially distal end of said cylindrical main body toward said shank.

4. The drill according to claim 1, wherein a relationship between said diameter of said large diameter portion of said cylindrical main body and a maximum value of the thickness of said web and a relationship between said diameter of said large diameter portion of said cylindrical main body and a minimum value of the thickness of said web are represented by the following expressions:

$$0.2D \leq W_1 \leq 0.4D;$$

$$0.15D \leq W_2 \leq 0.33D;$$

where D represents said diameter of said large diameter portion of said cylindrical main body;
$W_1$ represent the maximum value of the thickness of said web; and
$W_2$ represent the minimum value of the thickness of said web.

5. The drill according to claim 1, wherein a flute-width ratio of a width of each of said at least one flute to a width of each of said at least one land is 0.6-1.5 in a web-thickness maximized portion of said cylindrical main body in which the thickness of said web is maximized while said flute-width ratio is 0.8-1.7 in a web-thickness minimized portion of said cylindrical main body in which the thickness of said web is minimized.

6. The drill according to claim 1, wherein a surface of each of said at least one flute has a roughness curve whose maximum height Ry is not larger than 3 μm.

7. The drill according to claim 6,
wherein said cylindrical main body is coated with a hard coating;
and wherein said surface of each of said at least one flute coated with said hard coating is polished so as to have said roughness curve whose maximum height Ry is not larger than 3 μm.

8. The drill according to claim 1,
wherein said at least one flute consists of two flutes which are symmetrical with respect to said axis of said cylindrical main body,
wherein said at least one land consists of two lands which are joined by said web and each of which is located between said two flutes,
and wherein a front-side wall of each of said two flutes as viewed in the predetermined rotating direction is concaved in a direction away from a leading edge which is provided by a rear-side one of widthwise opposite edges of each of said two flutes as viewed in the predetermined rotating direction, such that a most concaved portion of said front-side wall is distant from a straight line which passes through said axis and a rear end of a corresponding one of said two lands as viewed in the predetermined rotating direction, by a predetermined distance that is equal to a half of value represented by the following expression:

$$0.15D \leq t \leq 0.35D;$$

where D represents said diameter of said large diameter portion of said cylindrical main body; and
t represents the value that is twice as large as said predetermined distance.

9. The drill according to claim 1, wherein said at least one flute has an axial length of at least ten times as large as said diameter of said large diameter portion of said cylindrical main body which is not larger than 8 mm.

10. The drill according to claim 1, further comprising an oil hole which is formed through said cylindrical main body and said shank and which opens in an end flank face each located on a rear side of said cutting edge as viewed in the predetermined rotating direction.

11. The drill according to claim 1, wherein said diameter of said large diameter portion is reduced as viewed in the direction away from said axially distal end of said cylindrical main body toward said shank, and said diameter of said small diameter portion is constant over an entire length of said small diameter portion.

* * * * *